(12) United States Patent
Pors et al.

(10) Patent No.: US 9,395,222 B2
(45) Date of Patent: Jul. 19, 2016

(54) MAGNETIZATION DEVICE FOR A NUCLEAR MAGNETIC FLOW METER

(71) Applicant: Krohne AG, Basel (CH)

(72) Inventors: Jan Teunis Aart Pors, Oud-Beijerland (NL); Cornelius Johannes Hogendoorn, Spijk (NL); Ariel de Graaf, Utrecht (NL); Marco Leendert Zoeteweij, Hendrik-Ido-Ambacht (NL)

(73) Assignee: Krohne AG, Basel (CH)

( * ) Notice: Subject to any disclaimer, the term of this patent is extended or adjusted under 35 U.S.C. 154(b) by 790 days.

(21) Appl. No.: 13/682,080

(22) Filed: Nov. 20, 2012

(65) Prior Publication Data

US 2013/0176024 A1 Jul. 11, 2013

Related U.S. Application Data

(63) Continuation-in-part of application No. 13/676,685, filed on Nov. 14, 2012, now abandoned.

(30) Foreign Application Priority Data

Nov. 20, 2011 (DE) .......................... 10 2011 118 839

(51) Int. Cl.
*G01V 3/00* (2006.01)
*G01F 1/716* (2006.01)
*G01F 1/74* (2006.01)

(52) U.S. Cl.
CPC . *G01F 1/716* (2013.01); *G01F 1/74* (2013.01)

(58) Field of Classification Search
CPC .................................. G01F 1/74; G01F 1/716
USPC .......................................................... 324/306
See application file for complete search history.

(56) References Cited

U.S. PATENT DOCUMENTS

| | | | |
|---|---|---|---|
| 4,355,236 A | 10/1982 | Holsinger | |
| 4,758,813 A * | 7/1988 | Holsinger | G01R 33/383 29/599 |
| 4,785,245 A * | 11/1988 | Lew | G01F 1/716 324/307 |
| 5,168,231 A | 12/1992 | Aubert | |
| 5,684,399 A * | 11/1997 | Bayer | G01F 1/716 324/300 |

(Continued)

FOREIGN PATENT DOCUMENTS

| | | |
|---|---|---|
| DE | 20 2010 004 915 U1 | 9/2010 |
| WO | 88/08126 A1 | 10/1988 |
| WO | 2007/120057 A1 | 10/2007 |

*Primary Examiner* — Rodney Fuller
(74) *Attorney, Agent, or Firm* — David S. Safran

(57) ABSTRACT

A magnetization device for permeation of a multiphase fluid flowing through a measurement tube of a nuclear magnetic flow meter with a magnetic field which is homogenous at least in one plane, with a plurality of permanent magnets for generation of a magnetic field and with a carrier, the carrier having at least one magnet receiver, each magnet receiver accommodating at least one of the permanent magnets, the shape of the magnet receivers and of the permanent magnets allowing movement of the permanent magnets in the magnet receivers only in one direction and the permanent magnets being by the magnet receivers formed by hollow profiles. The hollow profile magnet receivers can be receiving tubes for the magnets that can be turned around their longitudinal axis or the profiles can have a rotatable adapter for the magnets so that a first shimming action can be achieved with the profiles.

17 Claims, 4 Drawing Sheets

(56) References Cited

U.S. PATENT DOCUMENTS

| | | |
|---|---|---|
| 7,501,819 B2 | 3/2009 | Ong |
| 7,872,474 B2 * | 1/2011 | Pusiol .................... G01F 1/56 |
| | | 324/303 |
| 7,884,605 B2 | 2/2011 | Tamura et al. |
| 2008/0174309 A1 | 7/2008 | Pusiol et al. |
| 2008/0186024 A1 * | 8/2008 | Edwards ............ G01R 33/4831 |
| | | 324/303 |
| 2013/0174667 A1 * | 7/2013 | Pors ..................... G01F 1/716 |
| | | 73/861.04 |
| 2014/0028310 A1 * | 1/2014 | Zoeteweij ............... G01F 1/716 |
| | | 324/306 |
| 2014/0260587 A1 * | 9/2014 | Maute ..................... G01F 1/58 |
| | | 73/152.29 |

\* cited by examiner

MAGNETIZATION DEVICE FOR A NUCLEAR MAGNETIC FLOW METER

BACKGROUND OF THE INVENTION

1. Field of the Invention

The invention relates to a magnetization device for permeation of a multiphase fluid flowing through a measurement tube of a nuclear magnetic flow meter with a magnetic field which is homogenous at least in one plane, with a plurality of permanent magnets for generation of a magnetic field and with a carrier, the carrier having at least one magnet receiver, each of the magnet receivers accommodating at least one of the permanent magnets, the shape of the magnet receivers and of the permanent magnets allowing movement of the permanent magnets only in one direction in the magnet receivers and the permanent magnets held by the magnet receivers being arranged by the magnet receivers with reference to the magnetic field.

2. Description of Related Art

A nuclear magnetic flow meter determines the flow of the individual phases of a multiphase fluid, the flow velocities of the individual phases and the relative proportions of the individual phases in the multiphase fluid in the measurement tube by measuring and evaluating the voltage induced by the nuclear magnetic resonance of the multiphase fluid into a suitable sensor. The measurement principle of the nuclear magnetic resonance is based on the property of atomic nuclei with a free magnetic moment to process to the nuclear spin in the presence of a magnetic field. The precession of the vector representing the magnetic moment of the atomic nucleus takes place around the vector representing the magnetic field in place of the of atomic nucleus, the precession inducing a voltage into the sensor. The frequency of precession is called the Larmor frequency $\omega_L$ and is computed according to $\omega_L = \gamma \cdot B$, $\gamma$ being the gyromagnetic ratio and B being the amount of the magnetic field strength. The gyromagnetic ratio $\gamma$ is maximum for hydrogen nuclei, for which reason especially fluids with hydrogen nuclei are suited for nuclear magnetic flow meters.

A multiphase fluid composed essentially of crude oil, natural gas and salt water is delivered from an oil source. So-called test separators branch off a small part of the delivered fluid, separate the individual phases of the fluid from one another and determine the proportions of the individual phases in the fluid. Test separators are expensive, cannot be installed under the sea and do not allow real-time measurements. In particular, test separators are, however, unable to reliably measure crude oil proportions smaller than 5%. Since the crude oil proportion of each source drops continuously and the crude oil proportion of a plurality of sources is already less than 5%, it is currently impossible to exploit these sources.

Both crude oil and also natural gas and salt water contain hydrogen nuclei, for which, as already mentioned, the gyromagnetic ratio $\gamma$ is maximum. Nuclear magnetic flow meters are therefore suited especially for use on oil sources, also undersea directly on the source on the sea bed, but are not limited to this application. Other applications arise, for example, in the petrochemical or chemical industry. Branching off of the fluid is not necessary, and the entire fluid is measured in real time. Compared to test separators, nuclear magnetic flow meters are more economical and require less maintenance and can also especially reliably measure crude oil proportions less than 5% in the fluid, as a result of which the further exploitation of a host of oil sources becomes possible for the first time.

It is immediately apparent from the equation for computing the Larmor frequency $\omega_L$ that the Larmor frequency $\omega_L$ is proportional to the magnetic field strength B, and thus, the magnetic field strength B also acts directly on the voltage induced into the sensor. Heterogeneities in the magnetic field therefore reduce the measurement quality of nuclear magnetic flow meters, for which reason the task of the magnetization device is the permeation of the fluid with a magnetic field which is ordinarily homogeneous within the measurement tube. The required measurement accuracy determines the necessary homogeneity of the magnetic field. Often measurement methods are used which use a known gradient in the magnetic field so that the magnetic field is constant only in one plane.

U.S. Pat. No. 7,872,474 B2 discloses a magnetic resonance based apparatus and method to analyze and measure bi-directional flow that utilizes a stack of disks, formed of a plurality of bar magnets, which forms a hollow cylindrical permanent magnet, the magnetic field being homogeneous in the cylindrical interior of the magnet. The magnets of each disk are held between rings of non-magnetic material and fixed by the screws that are also made of non-magnetic material the discs of magnets piled up and held by non-magnetic screws.

In each individual disk of magnets forms a Halbach array. The important feature of a Halbach array is that the magnetic field forms largely on one side of the Halbach array, here, in the interior of the cylindrical magnet, and on the other side, only a very weak magnetic field forms, here, in the external space of the cylindrical magnet Since a strong magnetic field is required for high voltages induced into the sensor by the precession of the hydrogen atoms contained in the fluid, correspondingly strong bar magnets are used. Due to the plurality of bar magnets which are arranged tightly in each of the magnet disks, the introduction of the bar magnets into the magnet receivers is associated with a high expenditure of force. Moreover, the resulting magnetic field is initially not homogenous enough, for which reason the magnetic field must be made homogeneous by manipulation on each of the bar magnets. This process is called shimming. The introduction and shimming of the numerous bar magnets mean a considerable production and time expenditure, which is accompanied by the corresponding costs.

SUMMARY OF THE INVENTION

The primary object of the present invention is to devise a magnetization device with reduced production and time expenditure which will achieve sufficient homogeneity of the magnetic field that permeates the fluid.

The magnetization device in accordance with the invention in which the aforementioned object is achieved is, first of all, essentially characterized in that the magnet receivers are made as hollow profiles.

A hollow profile can be economically produced with various inner cross sectional contours which are perpendicular to the longitudinal axis of the hollow profile. For example, the inner cross sectional contour of a channel-shaped hollow profile is rectangular and one of the outer cross sectional contours of the permanent magnets is likewise rectangular and is dimensioned such that the permanent magnets can be moved in the hollow profile along only the longitudinal axis of the hollow profile, therefore are form-fit except for the longitudinal axis. The length of the hollow profile in this example is dimensioned such that a plurality of permanent magnets can be introduced. It is immediately apparent that the fixing of the permanent magnets by pushing the permanent magnets into these hollow profiles means a much lower production and time expenditure than the fixing of the permanent magnets with screws between a pair of rings as in the above described prior art. The complex stacking of the disks of individual magnets is replaced by a simple carrier for accommodating the hollow profiles, the carrier aligning the hollow profiles such that the fluid is permeated by a sufficiently homogenous magnetic field.

In one preferred embodiment of the magnetization device in accordance with the invention, the friction in the movement of the permanent magnets in the hollow profiles is reduced by lining of the hollow profiles, for example, with a polytetrafluoroethylene (PTFE) coating on the inner surfaces of the hollow profiles. The reduced friction distinctly reduces the expenditure of force for introducing the permanent magnets into the hollow profiles. After introducing the permanent magnets into the hollow profiles, the permanent magnets can be fixed in the hollow profiles by a first liquid adhesive and then a hardening substance. Sealing compounds, for example, are possible for this purpose.

In another preferred embodiment of the magnetization device in accordance with the invention, the carrier has plurality of receiving tubes. In each of the receiving tubes, a hollow profile is formed for accommodating at least one of the permanent magnets. The material for the receiving tubes can be a glass fiber composite material since it is easily possible in this material to form, for example, rectangular hollow profiles in the production process. Then, permanent magnets with a conventional rectangular cross section can be introduced into the rectangular hollow profiles so that the permanent magnets in the hollow profile move only along the longitudinal axis of the hollow profile, but cannot turn around the longitudinal axis of the hollow profile.

As the holder of the receiving tubes, the carrier can have at least one disk with receivers for the receiving tubes in which there is, preferably, a penetration for the measurement tube. Usually the receiving tubes of a magnetization device are of the same length so that the holder of the receiving tubes can be a disk on each end of the receiving tubes. The carrier then is comprised essentially of the receiving tubes and the two disks. If there is to be a homogenous magnetic field in the measurement tube along the longitudinal axis of the measurement tube, the alignment of the longitudinal axes of the receiving tube parallel to the longitudinal axis of the measurement tube is possible. Often, the permanent magnets are located in the receiving tubes as a Halbach array.

In another preferred exemplary embodiment of the magnetization device in accordance with the invention which is a development of the preceding exemplary embodiment, at least one of the receiving tubes is produced partially from a material which influences the magnetic field. For example, if a material having good magnetic conductivity is used in the receiving tubes on the poles of the permanent magnets, the resulting magnetic field can thus be advantageously influenced with respect to a homogenous magnetic field in the measurement tube. In addition or alternatively, the receiving tubes can be arranged in the carrier to be able to rotate around their longitudinal axis for advantageously influencing the homogeneity of the magnetic field in the measurement tube and then fixed against rotation. The rotation of the receiving tube is a first shimming of the magnetic field.

In another quite especially preferred configuration of the invention, the carrier encompasses at least one profile body, the profile bodies preferably being extrusion profile bodies. The cross-sectional profile of each of the profile bodies is constant along the respective longitudinal axis of the profile body, and in at least one of the profile bodies, at least one hollow profile is made to accommodate at least one of the permanent magnets. Preferably, here the hollow profiles are also made for accommodating rectangular permanent magnets such that the permanent magnets introduced into one of the hollow profiles can move along the longitudinal axis of the hollow profile, but cannot turn around the longitudinal axis of the hollow profile. Material for the profile bodies can be, for example, aluminum alloys or ceramics. For permeation of the measurement tube with a homogeneous magnetic field along the longitudinal axis of the measurement tube, again, an alignment of the longitudinal axes of the profile bodies parallel to the longitudinal axis of the measurement tube is recommended.

In another preferred embodiment of the magnetization device in accordance with the invention, at least one of the hollow profiles in at least one of the profile bodies of the carrier is made such that there is an adapter tube in this hollow profile that is able to rotate and the adapter tube can be fixed against rotation. In each of the adapter tubes, a hollow profile for accommodating at least one of the permanent magnets is made. The rotation of the adapter tube is a first shimming to improve the homogeneity of the magnetic field in the measurement tube.

In another quite especially preferred embodiment of the magnetization device of the invention in accordance with the invention, the carrier comprises at least two profile bodies and two profile bodies at a time are detachably connected by at least one positively shaped connecting profile on the first profile body and at least one negatively shaped connecting profile on the second profile body. The positive and the negative connecting profile are shaped such that two connected profile bodies can execute translational movement against one another only along one axis. By this type of connection, the profile bodies can be easily arranged, for example, around the measurement tube, and thus, the magnetization device can be easily installed.

In another special embodiment of the magnetization device in accordance with the invention, the carrier which contains at least one profile body is made as a yoke for guiding the magnetic backflow generated by the permanent magnets. The cross sectional profiles of each of the profile bodies are constant along the respective longitudinal axis of the profile body and in at least one of the profile bodies there is at least one hollow profile for accommodating at least one of the permanent magnets. The guidance of the magnetic backflow is an alternative to the arrangement of the permanent magnets as a Halbach array. Material at least for the yoke can be one with high magnetic conductivity.

In particular, there are a plurality of possibilities for configuring and developing the magnetization device in accordance with the invention as will be apparent from the following description of preferred exemplary embodiments in conjunction with the accompanying drawings.

DETAILED DESCRIPTION OF THE INVENTION

Figure 1:
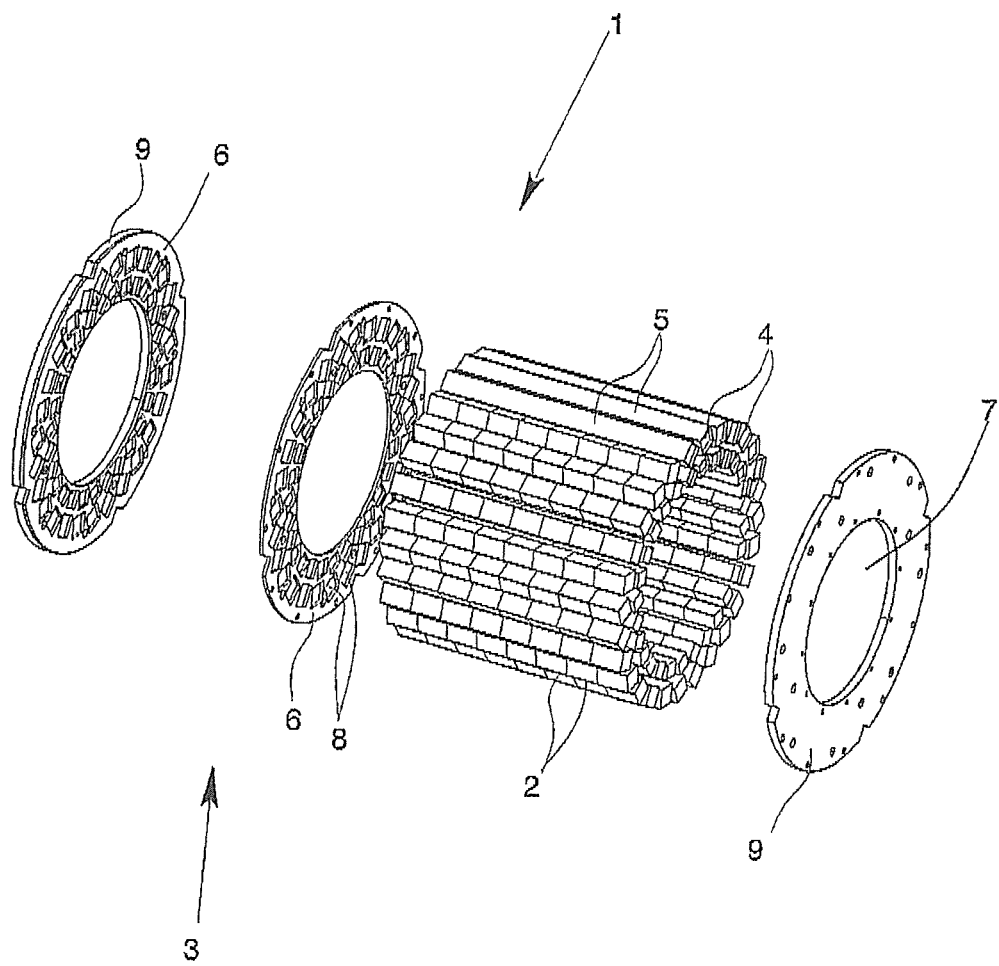
FIG. 1 is an exploded perspective view of a first exemplary embodiment of the magnetization device in accordance with the invention.

FIG. 1 shows the essential components of a magnetization device 1 in accordance with the invention; there are a plurality of permanent magnets 2 and a carrier 3 made of nonmagnetic material. The primary components of the carrier 3 are a plurality of receiving tubes 5 in the form of hollow profiles 4, two disk rings 6 with a central opening 7 for a measurement tube and with receivers 8 for the receiving tubes 5 and two end disk rings 9 which also have a central opening 7 for the measurement tube. In FIG. 1, not all receiving tubes 5 are visible in order to be able to show the permanent magnets 2 as well.

In each of the receiving tubes 5, eight permanent magnets 2 of the same length are introduced, the cross-sectional contour of these permanent magnets 2 being rectangular and form-fit with the hollow profiles 4 so that the permanent magnets 2 can be moved in one of the hollow profiles 4 only along the longitudinal axis of the hollow profile 4, but cannot turn around the longitudinal axis of the hollow profile 4. The permanent magnets 2 can be divided into groups with cross-sectional areas of different size, as a result of which the permanent magnets 2 have different magnetic field strengths.

The receivers 8, which are provided in the disk rings 6 which have been screwed to the end disk rings 9, arrange the receiving tubes 5 equipped with the permanent magnets 2 around the measurement tube such that the permanent magnets 2 form a Halbach array. The receiving tubes 5 are arranged essentially in two rings around the measurement tube and are fixed by long screws which are not shown here and which connect the two end disk rings 9 to one another and draw the two end disk rings 9 toward one another. A carrier known from the prior art for the same arrangement of the permanent magnets 2 requires sixteen disk rings 6, two disk rings 6 for each of the eight rings of the permanent magnets 2 so that the reduced cost associated with the present invention is quite apparent.

Figure 2:
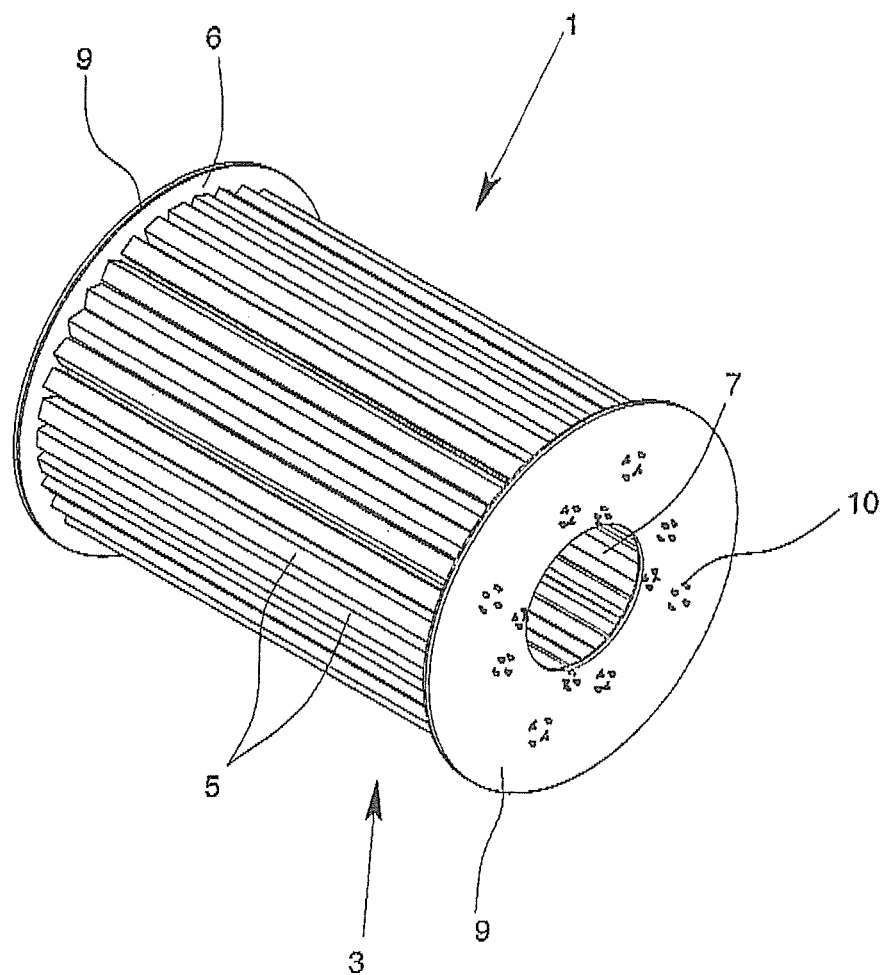
FIG. 2 is a perspective view of second exemplary embodiment of the magnetization device in accordance with the invention with several rotatable receiving tubes.

The exemplary embodiment of the magnetization device 1 in accordance with the invention which is shown in FIG. 2 differs from the exemplary embodiment which is shown in FIG. 1 essentially by the ability of several receiving tubes 5 to be turned around their longitudinal axis. Since the magnetic field strengths and directions of the individual permanent magnets 2 are subject to inevitable fluctuations by the production process of the permanent magnets 2, even in an optimum arrangement of the permanent magnets 2 by the carrier 3, heterogeneities of the resulting magnetic field in the measurement tube arise. The heterogeneities can be reduced by rotating individual receiving tubes 5.

The outer cross sectional contour of the rotatable receiving tubes 5 perpendicular to their longitudinal axis is circular and the pertinent receivers 8 in the disk rings 6 are accordingly circular and form-fit to the receiving tubes 5. Each of the rotatable receiving tubes 5 is provided with a rotation device 10 for rotation and fixing thereof. Each of the rotation devices 10 includes two opposite pins for turning and two opposing screws for fixing of the respective receiving tube 5. Accordingly, there are sets of four longitudinal holes in the end disk ring 9 that are arranged concentrically around the longitudinal axis of each of the rotatable receiving tubes 5.

Figure 3:
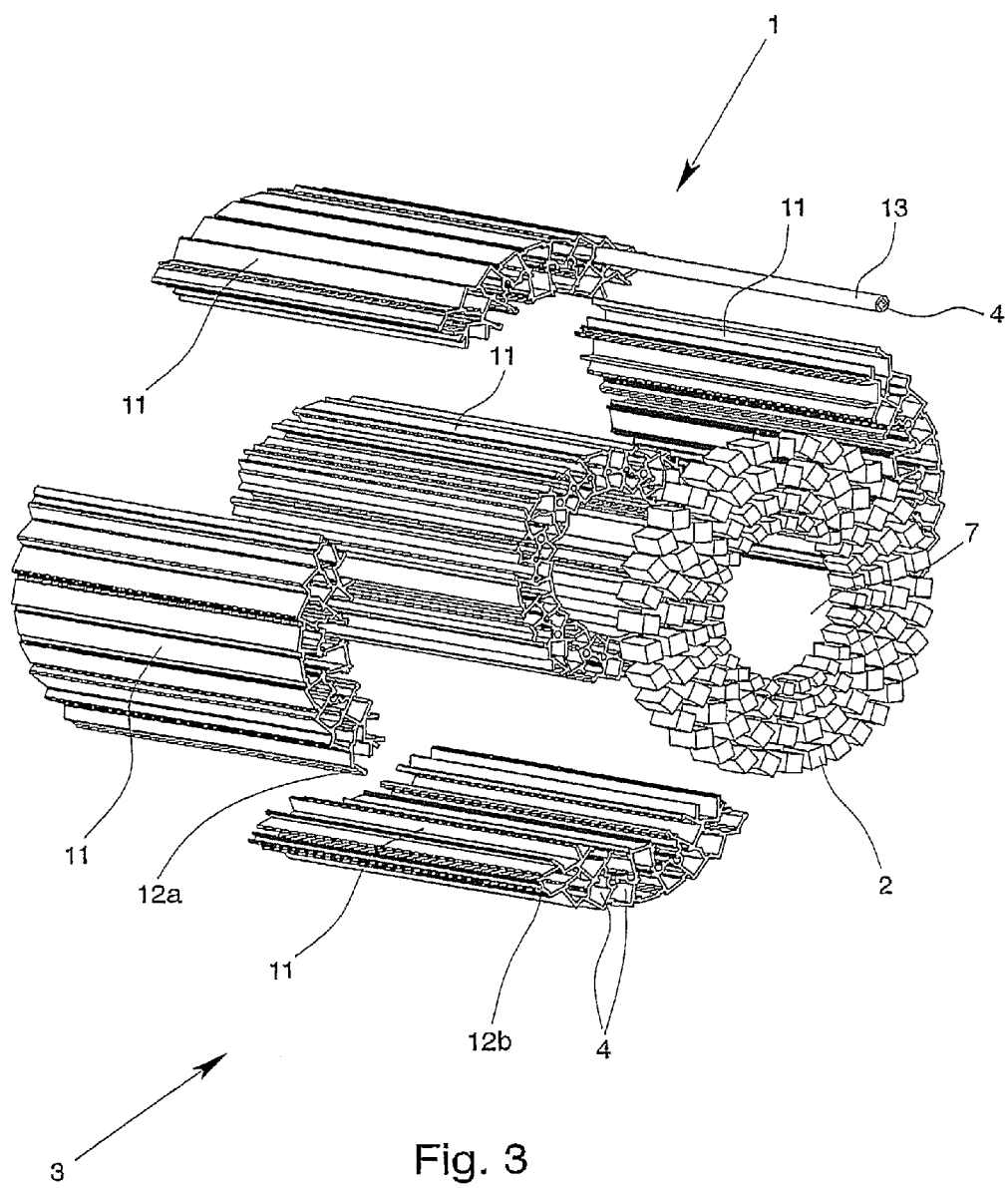
FIG. 3 is an exploded perspective view third exemplary embodiment of the magnetization device in accordance with the invention with a carrier for several extrusion profile bodies and with a rotatable adapter tube.

FIG. 3 shows a magnetization device 1 in accordance with the invention with the carrier 3 assembled essentially from several extrusion profile bodies 11 produced from an aluminum alloy. All extrusion profile bodies 11 have the same length and each of the extrusion profile bodies 11 has a plurality of hollow profiles 4. The inner cross sectional contour of each of the hollow profiles 4 perpendicular to the longitudinal axis of the corresponding hollow profile 4 is made rectangular, not all cross-sectional contours of the extrusion profile bodies 11 being closed, i.e., some have channel-shaped open contours. The open contours, in the assembled state, are closed by the other extrusion profile bodies 11.

The permanent magnets 2 all have the same length so that the same number of permanent magnets 2 is introduced into each of the hollow profiles 4, and they can be divided into groups with rectangular cross-sectional areas of different sizes perpendicular to their longitudinal axis, as a result of which the permanent magnets 2 have different magnetic field strengths. The permanent magnets 2 which have been introduced into one of the hollow profiles 4 cannot turn around the longitudinal axis of the corresponding hollow profile 4, the inner cross sectional contour of the hollow profile 4 perpendicular to the longitudinal axis of the hollow profile 4 not being equal to the outer cross sectional contour of the permanent magnets 2 which have been introduced into the hollow profile 4.

Optionally, as shown for the upper the cylindrical extrusion profile body 11 in FIG. 3, at least one of the hollow profiles 4 can have an a rotatable adapter tube 13 therein, the adapter tube being rotatable about the longitudinal axis of the respective hollow profile 4 and being fixable against rotation in plural positions. The adapter tube 13 has an inner hollow profile for accommodating one or more of the permanent magnets 2. Rotation of the adapter tube 13 can provide a first shimming of the magnetic field and advantageously improve the homogeneity of the magnetic field in the measurement tube.

In the cylindrical extrusion profile body 11, concentrically along the longitudinal axis of the cylindrical extrusion profile body 11 there is an opening 7 for the measurement tube and the other four extrusion profile bodies 11 are arranged around the cylindrical extrusion profile body 11 so that the longitudinal axes of the hollow profiles 4 are aligned parallel to one another and parallel to the longitudinal axis of the cylindrical extrusion profile body 11. The permanent magnets 2 are arranged in the carrier 3 such that they form a Halbach array.

Each pair of the extrusion profile bodies 11 have a first extrusion profile body 11 with a positive connecting profile 12a and a second extrusion profile body 11 with a negative connecting profile 12b. The outer cross-sectional contour perpendicular to the longitudinal axis of the positive connecting profile 12a and the inner cross-sectional contour perpendicular to the longitudinal axis of the negative connecting profile 12b are shaped to form-fit with each other and are made such that, in the connected state, only mutual movement of the two extrusion profile bodies 11 along the longitudinal axis of the positive connecting profile 12a is possible.

A movement of the permanent magnets 2 in the hollow profiles 4 along the longitudinal axis of the cylindrical extrusion profile body 11 and a movement of the extrusion profile bodies 11 relative to one another along the longitudinal axis of the cylindrical extrusion profile body 11 are inhibited by two end disk rings 9, which are not shown here. In each of the two end disk rings 9, there is a central opening for the measurement tube and there are bores for the penetration of screws as shown in FIG. 1. Accordingly, in the end faces of the extrusion profile bodies 11 there are threads for screw connection to the end disk rings 9.

Figure 4:
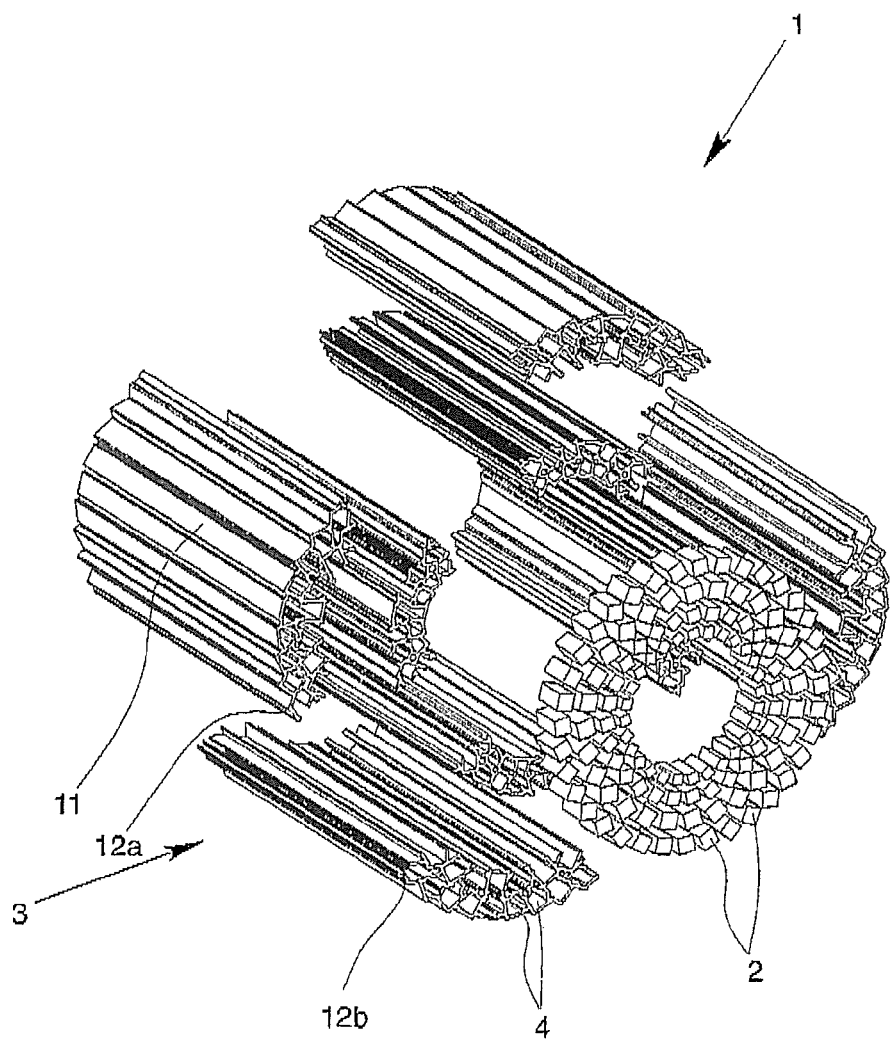
FIG. 4 shows a fourth embodiment with a carrier of several extrusion profile bodies, in an exploded diagram.

FIG. 4 shows another magnetization device 1 in accordance with the invention with the carrier 3 assembled essentially from several extrusion profile bodies 11 which have been produced from a plastic in an injection molding process. The magnetization device 1 differs from the magnetization device 1 shown in FIG. 3 essentially by the replacement of the one-piece cylindrical extrusion profile body 11 by a multi-part extrusion profile body 11.

Compared to the magnetization devices 1 in accordance with the invention which are shown in FIGS. 1 and 2, the production effort and thus also the costs are again reduced in the magnetization devices 1 shown in FIGS. 3 and 4.

In part plastic, in part ceramic have been addressed above as the material to be used. Instead, ceramic or aluminum can also be used.

What is claimed is:

1. A magnetization device for permeation of a multiphase fluid flowing through a measurement tube of a nuclear magnetic flow meter with a magnetic field which is homogenous at least in one plane, comprising:
   a plurality of permanent magnets for generation of the magnetic field and
   a carrier, the carrier having at least one magnet receivers, each magnet receiver accommodating at least one of the permanent magnets, the shape of the magnet receivers and of the permanent magnets allowing movement of the permanent magnets into the magnet receivers in only one direction,
   wherein the magnet receivers are hollow profiles that hold the permanent magnets so as to produce said magnetic field which is homogenous at least in one plane, and
   the permanent magnets held by the magnet receivers being arranged by the magnet receivers with reference to the magnetic field.

2. The magnetization device in accordance with claim 1, wherein the hollow profiles have a lining which reduces friction in movement of the permanent magnets in the hollow profiles.

3. The magnetization device in accordance with claim 1, wherein the permanent magnets are fixed in the hollow profiles by a hardened liquid.

4. The magnetization device in accordance with claim 1, wherein the carrier has a plurality of receiving tubes, wherein each of the receiving tubes contains a respective hollow profile for accommodating said at least one of the permanent magnets.

5. The magnetization device in accordance with claim 4, wherein the carrier has at least one disk as a holder of the receiving tubes.

6. The magnetization device in accordance with claim 4, wherein said at least one disk has a central opening for receiving a measurement tube of a nuclear magnetic flow meter.

7. The magnetization device in accordance with claim 4, wherein longitudinal axes of the receiving tubes are aligned parallel to a central longitudinal axis of a passage for receiving a measurement tube of a nuclear magnetic flow meter.

8. The magnetization device in accordance with of claim 4, wherein at least one of the receiving tubes is at least partially made of a material which influences a magnetic field.

9. The magnetization device in accordance with claim 4, wherein at least one of the receiving tubes is arranged in the carrier in a manner enabling said at least one tube to be turned around a longitudinal axis thereof for influencing the magnetic field and wherein means are provided for fixing said at least one tube in a plurality positions to which said at least one tube is turnable.

10. The magnetization device in accordance with claim 1, wherein the carrier encompasses a plurality profile bodies, the cross sectional profile of each of the profile bodies being constant along a longitudinal axis of the respective profile body, and wherein, in at least one of the profile bodies, at least one hollow profile accommodates at least one of the permanent magnets.

11. The magnetization device in accordance with claim 10, wherein the profile bodies are extruded profile bodies.

12. The magnetization device in accordance with claim 10, wherein the longitudinal axes of the profile bodies are aligned parallel to a longitudinal axis of a passage for receiving a measurement tube of a nuclear magnetic flow meter.

13. The magnetization device in accordance with claim 12, wherein said profile bodies are detachably connected by at least one positively shaped connecting profile on a first of the profile bodies and at least one negatively shaped connecting profile on a second of the profile bodies and wherein the positive and the negative connecting profiles are shaped such that, in a connected state thereof, a translational movement of the positive and negative connecting profiles relative to one another is possible only along one axis.

14. The magnetization device in accordance with claim 10, wherein the carrier is a yoke for guiding magnetic backflow generated by the permanent magnets.

15. The magnetization device in accordance with claim 1, wherein the permanent magnets are arranged by the carrier as a Halbach array.

16. The magnetization device in accordance with claim 1, wherein the carrier is made of at least one material selected from the group comprised of an aluminum alloy, a ceramic, a glass fiber composite material and a plastic.

17. The magnetization device as claimed in claim 1, wherein at least one of the hollow profiles has a rotatable adapter tube therein, the adapter tube being fixable against rotation in plural positions, and wherein an inner hollow profile for accommodating at least one of the permanent magnets is provided in the adapter tube.

* * * * *